United States Patent
Bauer et al.

(10) Patent No.: US 6,902,391 B2
(45) Date of Patent: Jun. 7, 2005

(54) TEMPERATURE-CONTROLLED FUEL VALVE, ESPECIALLY FOR A FUEL-OPERATED HEATING BURNER OF A VEHICLE HEATING SYSTEM

(75) Inventors: Thomas Bauer, Metzingen (DE); Walter Blaschke, Deizisau (DE)

(73) Assignee: J. Eberspächer GmbH & Co. KG, Esslingen (GE)

( * ) Notice: Subject to any disclaimer, the term of this patent is extended or adjusted under 35 U.S.C. 154(b) by 28 days.

(21) Appl. No.: 10/350,389

(22) Filed: Jan. 23, 2003

(65) Prior Publication Data

US 2003/0152881 A1 Aug. 14, 2003

(30) Foreign Application Priority Data

Feb. 12, 2002 (DE) .......................... 102 05 708

(51) Int. Cl.[7] .................................................. F23N 5/02
(52) U.S. Cl. ........................ 431/75; 431/280; 236/100; 237/2 A
(58) Field of Search ................. 431/280, 281, 431/75, 77, 18, 12; 237/12.3 C, 2 A; 236/100, 99 K, 80 R, 87, 86

(56) References Cited

U.S. PATENT DOCUMENTS

| | | | |
|---|---|---|---|
| 3,024,835 A | | 3/1962 | Ryder |
| 3,841,551 A | | 10/1974 | Ota |
| 4,085,775 A | * | 4/1978 | Steele, Jr. ............... 137/625.5 |
| 4,142,675 A | | 3/1979 | Maltby |
| 4,285,467 A | | 8/1981 | Maltby |
| 4,375,873 A | * | 3/1983 | Enomoto et al. ............. 236/86 |
| 4,450,868 A | | 5/1984 | Duval et al. |
| 4,488,680 A | * | 12/1984 | Itoh ......................... 236/93 A |
| 4,715,808 A | * | 12/1987 | Heath et al. .................. 431/18 |
| 4,915,615 A | | 4/1990 | Kawamura et al. |
| 5,732,880 A | | 3/1998 | Langen et al. |

FOREIGN PATENT DOCUMENTS

| | | |
|---|---|---|
| CH | 598 031 | 4/1978 |
| DE | 40 14 501 | 11/1991 |
| DE | 43 07 841 | 1/1994 |
| DE | 195 26 003 | 2/1996 |
| DE | 100 58 516 A | 5/2002 |
| EP | 0 271 999 | 6/1988 |
| JP | 10 278558 A | 10/1998 |

* cited by examiner

Primary Examiner—Sara Clarke
(74) Attorney, Agent, or Firm—McGlew and Tuttle, P.C.

(57) ABSTRACT

A temperature-controlled fuel valve, especially for a fuel-operated heating burner of a vehicle heating system has at least one valve member (40) that is adjustable as a function of a temperature in the area of a heating burner (30).

10 Claims, 2 Drawing Sheets

TEMPERATURE-CONTROLLED FUEL VALVE, ESPECIALLY FOR A FUEL-OPERATED HEATING BURNER OF A VEHICLE HEATING SYSTEM

FIELD OF THE INVENTION

The present invention pertains to a temperature-controlled fuel valve, which can be used especially in a fuel-operated heating burner of a vehicle heater.

BACKGROUND OF THE INVENTION

In heaters used in vehicles, which may be operated, e.g., as parking heaters or auxiliary heaters, the fuel is taken up, in general, in a metering pump from a fuel tank via a suction line and is introduced by the metering pump under pressure into the combustion chamber of the heating burner via a pressure pipe. To ignite the fuel introduced into the combustion chamber, e.g., by evaporation or atomization together with the combustion air, which is likewise introduced, at the beginning of a phase of operation, e.g., an igniting member designed as a glow-type ignition pin is provided.

The problem arises during the operation of such systems that fuel is still present in the line section between the metering pump and the combustion chamber on switching off, and this fuel still evaporates at least in the area of the pressure pipe close to the combustion chamber with the ignition stopped and thus leads to emissions that are potentially hazardous as to ones health. A generally asymmetric feed of the fuel into the combustion chamber during the operation leads to a combustion that is not distributed uniformly over the combustion chamber, as a consequence of which the combustion does not take place in the optimal lambda range in all areas of the combustion chamber, which may lead to the formation of deposits.

SUMMARY OF THE INVENTION

The object of the present invention is to provide measures with which undesired emissions can be reduced and the quality of the combustion in a heating burner can be improved.

This object is accomplished according to the present invention by a temperature-controlled fuel valve, especially for a fuel-operated heating burner of a vehicle heating system, comprising at least one valve member adjustable as a function of the temperature in the area of a heating burner.

It can be ensured by the use of a temperature-controlled fuel valve that the introduction of fuel into a combustion chamber can take place as a function of the temperature and consequently also as a function of the combustion conditions. Due to the information feedback that is thus present, it is ensured that fuel can be sent into the correct area of a heater at a suitable time and in a suitable amount.

Provisions may be made for this, e.g., for the fuel valve to have one feed area and two drain areas, and for the valve member to interrupt a connection between the feed area and the two drain areas at a temperature located in a first temperature range, for the valve member not to interrupt the connection between the feed area and the two drain areas at a temperature in a second temperature range that is higher than the first temperature range, and for the valve member not to interrupt the connection between the feed area and one of the drain areas and to interrupt the connection between the feed area and the other of the drain areas at a temperature in a third temperature range that is higher than the second temperature range.

To make it possible to bring about the temperature-controlled switchover between different flow paths in a simple manner in the fuel valve according to the present invention, it is proposed that a first flow path area, which can be brought into connection with a feed area and which leads to a first drain area and to a second flow path area, be provided in a valve body, wherein the second flow path area leads to a second drain area. Furthermore, provisions may be preferably made for the valve member to close the first flow path area at a temperature in the first temperature range, to close the second flow path area at a temperature in the third temperature range, and not to close the first and second flow path areas at a temperature in the second temperature range.

The defined switchover between different flow paths by the fuel valve according to the present invention may be achieved, e.g., by the valve member having a first valve member surface and a second valve member surface directed opposite the first valve member surface and by providing a first valve seat surface and a second valve seat surface in the valve body for the first valve member surface and for the second valve member surface, respectively, wherein the first flow path area opens into the first valve seat surface and the second flow path area opens into the second valve seat surface, wherein provisions may, furthermore, be preferably made for the second valve member surface not to be seated on the second valve seat surface when the first valve member surface is seated on the first valve seat surface.

To detect the temperature and to actuate the valve member correspondingly, the fuel valve according to the present invention may have, furthermore, a temperature sensor arrangement with a temperature sensor medium with temperature-dependent volume as well as a transmission arrangement which can be displaced by a change in the temperature of the temperature sensor medium and which admits pressure to the valve member.

The conversion of a change in the volume of the temperature sensor medium into a pressing movement for the valve member may be achieved, e.g., in a very simple manner by the transmission arrangement comprising a closing element that can be deformed by the change in the volume of the temperature sensor medium and a plunger that can be displaced by a deformation of the closing element.

The present invention pertains, furthermore, to a heating system, especially for a vehicle, comprising a heating burner with a combustion chamber, a pump arrangement for delivering fuel to the combustion chamber, as well as a temperature-controlled fuel valve according to the present invention in the flow path between the pump arrangement and the combustion chamber.

By integrating the fuel valve according to the present invention in the area between the metering pump and the heating burner, preferably as close to the heating burner as possible, it is ensured that the line path that cannot be closed any longer is kept as short as possible. The amount of the fuel that is not burned any more when the combustion is stopped and then tends to evaporate because of the still comparatively high temperatures can be markedly reduced in this manner.

Furthermore, provisions may be made for arranging a temperature sensor arrangement of the fuel valve for detecting a temperature in the area of an igniting member of the heating burner or in the area of a waste gas stream.

To ensure in the heating system according to the present invention that the fuel is introduced into the area that is optimal for different operating states and for the states of combustion occurring as a function of the temperature, it is proposed, furthermore, that fuel be able to be introduced into the combustion chamber in the area of the igniting member via a first drain area of the fuel valve and that fuel be able to be introduced into the combustion chamber in an area located farther away from the igniting member via a second drain area of the fuel valve.

A further improvement in the quality of the combustion can be achieved by the second drain area providing a smaller flow resistance than the first drain area.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
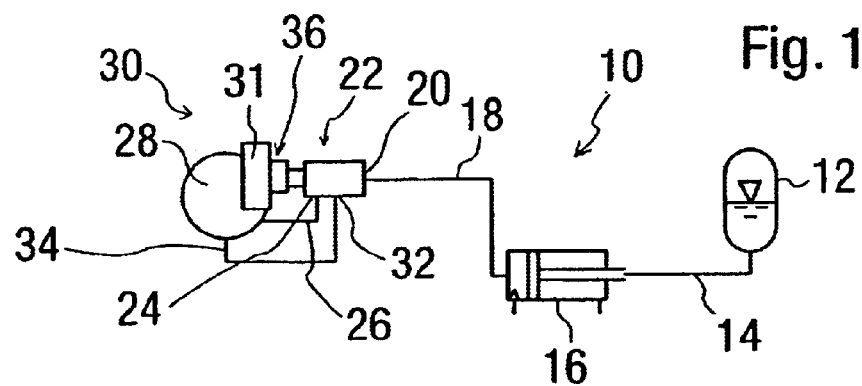
FIG. 1 is a schematic view of a heating system according to the present invention with a temperature-controlled fuel valve.

Referring to the drawings in particular, a heating system according to the present invention is designated in general by 10 in FIG. 1. A fuel line 14 leads from a fuel tank 12 to a metering pump 16, which may be of the conventional design. Another fuel line 18 leads from the metering pump 16 to a feed area 20 of a temperature-controlled fuel valve 22. The fuel introduced under increased pressure into the fuel valve 22 via the line 18 can be introduced via a first drain area 24 and another fuel line 26 into a combustion chamber 28 of a heating burner 30 in an area that is located close to a glow-type ignition pin or another igniting member 31. Furthermore, fuel can be introduced via a second drain area 32 and another line 34 from the fuel valve 22 into an area of the combustion chamber 28 that is located farther away from the glow-type ignition pin 31. It shall be pointed out here that the heating burner 30 may be an atomization burner or a vaporizing burner. The fuel is released into the combustion chamber 28 accordingly by atomization or evaporation from a porous medium to form an ignitable mixture there with the combustion air that is likewise introduced into the combustion chamber 28.

Furthermore, a temperature sensor arrangement of the fuel valve 22, which is designated generally by 36 and which detects a temperature in the combustion chamber 28 in the area of the glow-type ignition pin 31, can be recognized in FIG. 1. Depending on the temperature, the fuel is released via the fuel valve 22 via both drain areas 24, 32, via only one of the drain areas 24, 32 or via neither of the drain areas 24, 32. This will be described in detail below with reference to FIGS. 2 through 5.

Figure 2:
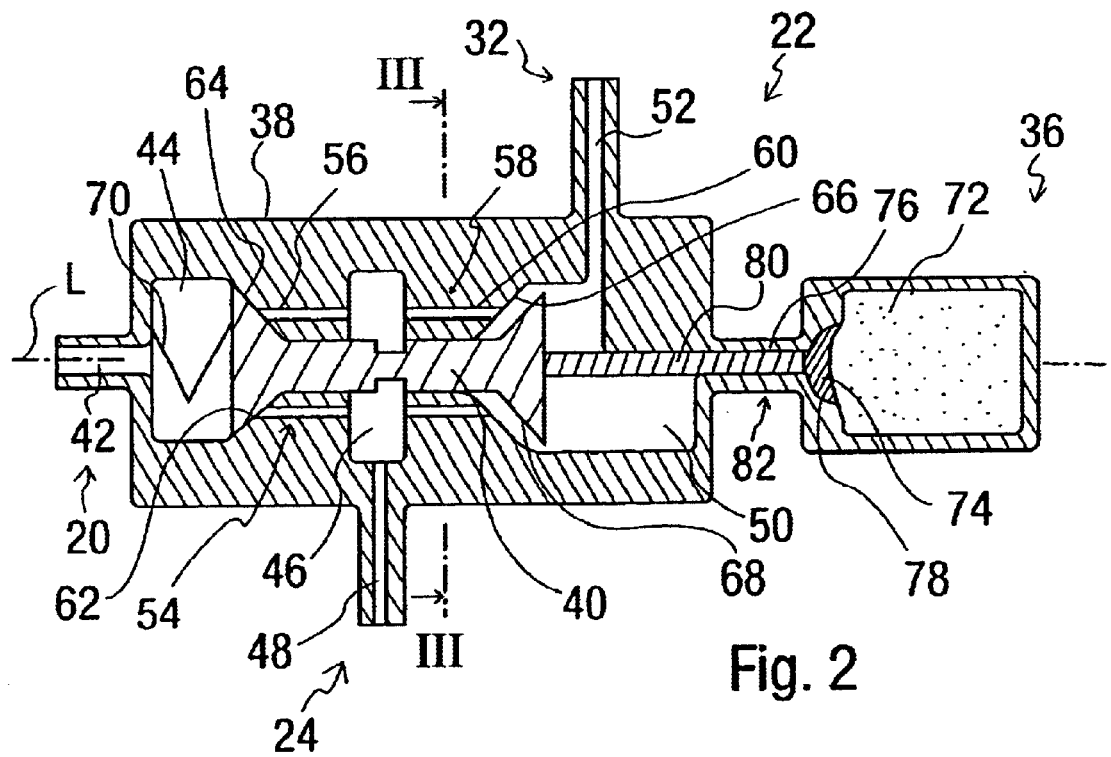
FIG. 2 is a longitudinal sectional view of the fuel valve.
Figure 3:
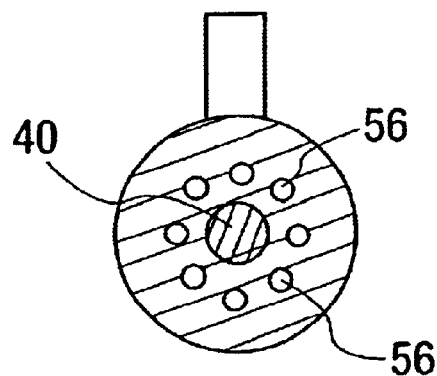
FIG. 3 is a cross-sectional view of the fuel valve shown in FIG. 2, cut along a line III—III in FIG. 2, wherein the fuel valve is in an operating state associated with a lower temperature.
Figure 4:
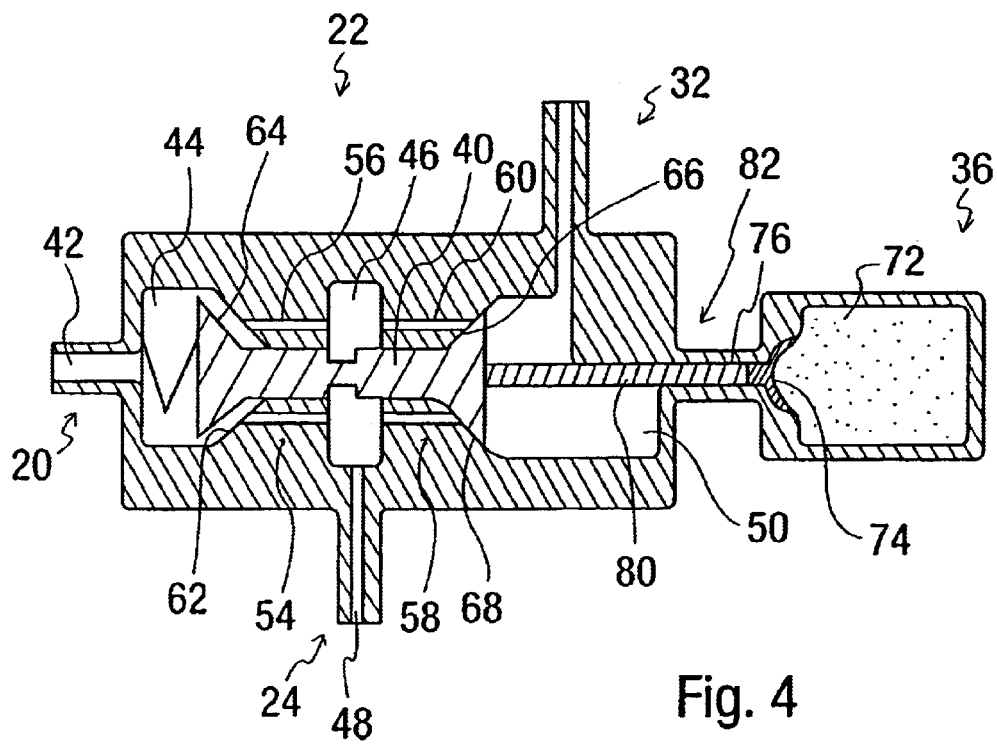
FIG. 4 is a view of the temperature-controlled fuel valve corresponding to FIG. 2 in a state that is associated with a higher temperature occurring during the phase of ignition.
Figure 5:
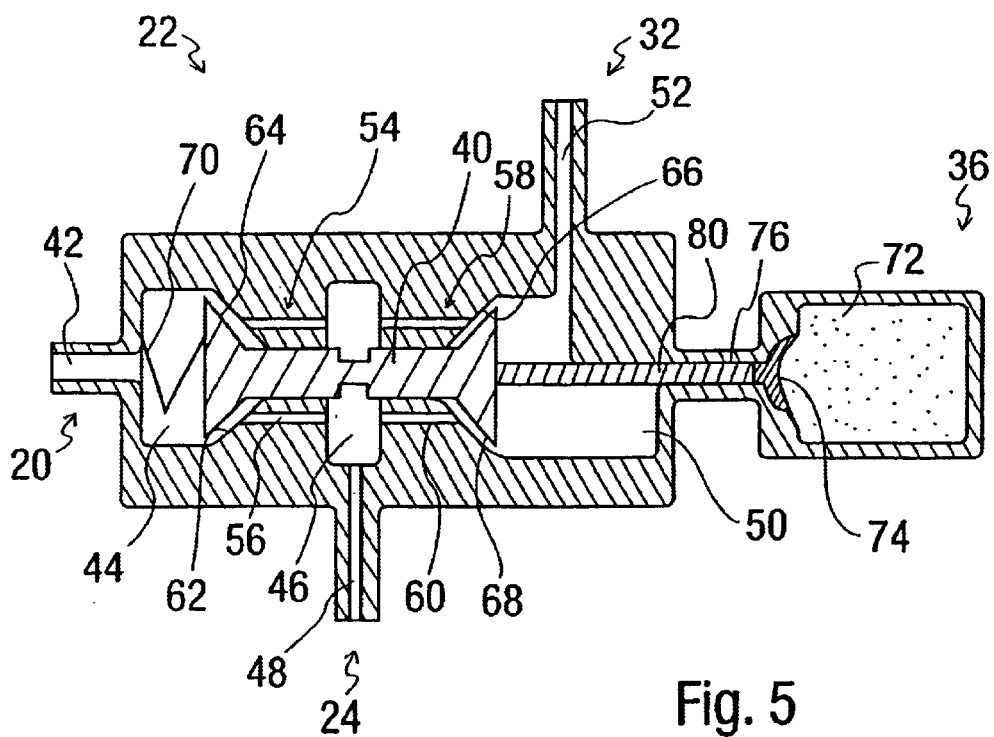
FIG. 5 is another view of the temperature-controlled fuel valve corresponding to FIG. 2 in a state that is associated with a medium temperature occurring during the normal combustion.

The internal structure of the fuel valve 22 can be first recognized in FIG. 2. This fuel valve comprises a valve body 38, in which a valve member or valve slide 40 is accommodated slidingly in the direction of a valve slide longitudinal axis L. An inlet opening 42 of the feed area 20 leads into a first valve chamber 44. An outlet opening 48 of the first drain area 24 opens into a second valve chamber 46, which follows the first valve chamber 44 in the direction of the longitudinal axis L. An outlet opening 52 of the second drain area 32 opens into a third valve chamber 50, which follows the first valve chamber 44 in the direction of the longitudinal axis L and follows the second valve chamber 46. A first flow path area 54 comprises a plurality of hole-like channels 56, which extend essentially in the direction of the longitudinal axis L and establish a connection between the first valve chamber 44 and the second valve chamber 46. It can be recognized in FIG. 3 that the channels 56 are arranged in a ring-like pattern around the valve slide 40. A second flow path area 58 comprises a plurality of channels 60, which, just like the channels 56 of the first flow path area 54, are arranged in a ring-like pattern around the valve slide 40 and establish a connection between the second valve chamber 46 and the third valve chamber 50.

The channels 56 of the first flow path area open into the first valve chamber 44 in the area of a first valve seat surface 62. This first valve seat surface 62 has an approximately truncated cone-like shape. In association with this first valve seat surface 62, the valve slide 40 has a first valve slide surface 64 with a corresponding truncated cone shape.

The channels 60 of the second flow path area 58 open into the third valve chamber 50 in the area of a second valve seat surface 66, which likewise has an essentially truncated cone shape. In association with this second valve seat surface 66, the valve slide 40 has a second valve slide surface 68, which has a shape corresponding to that of the second valve seat surface 66 and therefore also has a truncated cone shape in the example being shown. It can be recognized that the first valve seat surface 64 and the second valve seat surface 68 are directed or oriented opposite each other.

The valve slide 40 is pretensioned by a pretensioning spring 70 supported at the valve body 38 into a first operating position, in which the valve slide surface 64 is seated on the valve seat surface 62, as can be recognized from FIG. 2, and thus closes the channels 56 of the first flow path area 54. Because of the length of the valve slide 40, the second valve slide surface 68 is lifted off from the second valve seat surface 66 in this first operating position.

The temperature sensor arrangement already mentioned in reference to FIG. 1 has a chamber 72. A medium with temperature-depending volume is accommodated in this chamber 72. This may be, e.g., a gas-like medium. The chamber 72 is closed off at one end area by an elastic closing element 74 toward a channel area 76. The closing element 74, which is, e.g., a membrane, may be made of a rubber material or the like, so that an essentially tight closure of the chamber 72 is achieved at the same time by inserting this closing element 74 in a corresponding depression 78. A plunger 80, which forms essentially a transmission arrangement 82 together with the closing element 74, is provided in the channel area 76. As will be described below, temperature-determined volume changes of the medium contained in the chamber 72 are transmitted by this transmission arrangement 82 as adjusting movements to the valve slide 40. The assembly group comprising the valve slide 40, the plunger 80 and the elastic closing element 74 is held in an essentially rigid mutual contact during all phases of operation by the pressing action of the spring 70, on the one hand, and, on the other hand, by the medium in the chamber 72, which is, in general, under pressure.

It shall be assumed at first that the heating system 10 is not in operation and that the medium contained in the chamber 72 and positioned in the area of the glow-type ignition pin 31 requires a relatively small volume. The valve slide 40 is moved by the pretensioning action of the spring 70 into its first operating position already described above, in which the feed area 20 has no connection with the two drain areas 24, 32 because of the closure of the first flow path area 54. Thus, fuel cannot flow into the combustion chamber 28 via any of the feed areas. The line area in which fuel may still be present for a possible evaporation after the stopping of a combustion operation is limited essentially to the length of the two lines 26, 34.

If the heating system 10 is now put into operation, the glow-type ignition pin 31 is first heated. The temperature then rises sharply in the environment of the glow-type ignition pin 31, as a consequence of which the medium contained in the chamber 72 seeks to enlarge its volume. The pressure in the chamber 72 will rise, and the elastic closing element 74 will undergo such a deformation under the effect of this pressure that it will protrude farther into the channel area 76. As a consequence, the plunger 80 will be displaced as well. The plunger 80 now applies pressure on the valve slide 40, which will now come to be seated with its second valve slide surface 68 at this comparatively high temperature on the second valve seat surface 66 in the area of the temperature sensor arrangement 36, i.e., in the area of the glow-type ignition pin 31. The first valve slide surface 64 is no longer seated on the first valve seat surface 62 in this second operating position of the fuel valve 22, which is assumed during the ignition operation. The first flow path area 54 is thus released and there is now a connection between the first valve chamber 44 and the second valve chamber 46. Since the second valve slide surface 68 is seated on the second valve seat surface 66, the second flow path area 58 is now blocked, so that there is no connection between the second valve chamber 46 and the third valve chamber 50. The fuel sent by the metering pump 16 to the fuel valve 22 will now flow into the second valve chamber 46 through the inlet opening 42 of the feed area 20, the first valve chamber 44 and the channels 56 of the first flow path area 54 and it will be released herefrom via the outlet opening 48 of the first drain area 24 and the line 26 that can be recognized in FIG. 1 into the combustion chamber 28. In this state, in which the ignition shall begin, the fuel is consequently introduced into the combustion chamber 28 into an area close to the glow-type ignition pin 31, so that the combustion can start very rapidly.

After the rated output has been essentially reached and the combustion has spread over a larger volume area or the entire volume area of the combustion chamber 28, the power supply to the glow-type ignition pin 31 is stopped. The temperature in the area of this glow-type ignition pin 31 decreases again, but it remains higher because of the combustion taking place in the combustion chamber 28 than in a state in which the heating system 10 is fully out of operation. Because of the decrease in temperature in the area of the glow-type ignition pin 31, the temperature of the medium enclosed in the chamber 72 will again decrease as well, which will lead to a corresponding decrease in the inner pressure in the chamber 72. Due to the pretensioning action of the spring 70, the valve slide 40 will now move because of the reduced pressure in the chamber 72, together with the plunger 80, from the second operating position shown in FIG. 4 into an operating position shown in FIG. 5, in which there is a balance of forces between the force of the spring 70 and the pressing force of the medium enclosed in the chamber 72. It can be recognized that due to the decrease in the pressure, the elastic closing element 74 has again moved farther out of the channel area 76. In this third operating position, both valve slide surfaces 64, 68 are positioned at a spaced location from the respective associated valve seat surfaces 62, 66. Both flow path areas 54, 58 are therefore released. The first valve chamber 44 is therefore in connection through the first flow path area 54 with the second valve chamber 46, which is in turn in connection through the second flow path area 58 with the third valve chamber 50. The fuel fed in under pressure through the inlet opening 42 of the feed area 20 will enter the second valve chamber 46 through the channels 56 of the first flow path area 54 after flowing through the first valve chamber 44. The fuel will then flow off from there through the outlet opening 48 of the first drain area 24, on the one hand, and, on the other hand, it will enter the third valve chamber 50 through the channels 60 of the second flow path area 58, and it will flow off from the third valve chamber 50 through the outlet opening 52 of the second drain area 32. Consequently, the fuel is introduced into the combustion chamber 28 in this normal state of combustion via both drain areas 24, 32 and consequently the two lines 26, 34 recognizable in FIG. 1. Better distribution of the fuel made available for the combustion is therefore already achieved due to the two introduction points. Furthermore, provisions may be made for the line 34 that is additionally used to introduce fuel in the normal combustion operation to lead into an area that is optimal for this normal combustion. It can also be recognized in the figures that the second drain area 32 has a larger flow cross section than the first drain area 24. Due to the fact that the flow resistance is thus lower in the second drain area 32, the larger portion of the fuel is introduced via the line 34 into the combustion chamber 28 during the normal combustion operation, which leads to a further improvement in combustion together with the selection of the area of introduction. It shall be pointed out here that the splitting of the two fuel streams may, of course, also be brought about by means of throttling points located in other areas. For example, the selection of the overall cross-sectional area of the channels 60 of the second flow path area 58 already has a certain throttling function. Throttling elements may also be provided in the lines 26, 34, and these throttling elements, just as the throttling points provided in the valve body, are functionally to be associated with the respective drain areas 24 and 52 in the sense of the present invention, because they cause essentially that, depending on the setting of the throttling ratios, a larger amount of fuel will be discharged via one of the drain areas than via the other of the drain areas.

It is consequently achieved by the use of the temperature-controlled fuel valve according to the present invention that the undesired evaporation of fuel that is no longer burned will decrease markedly when the combustion operation is stopped because of the reduction of the volume of the fuel available for the evaporation. Furthermore, the temperature-controlled fuel valve designed according to the present invention ensures that a temperature-adapted distribution of the fuel introduction can take place in all operating states, and it can be recognized in this connection, in particular, that a correspondingly continuous transition in the amounts of fuel introduced, which flow via both drain areas 24, 32, is achieved at the time of the transition from the second operating position shown in FIG. 4, which is associated with the ignition operating, into the third operating position shown in FIG. 5, which is associated with the normal combustion operation, due to the gradual and non-abrupt displacement of the valve slide 40, along with a correspondingly gradual change in temperature in the area of the glow-type ignition pin 31.

It shall finally also be pointed out that the fuel valve shown in the figures is represented in a simplified form. It is obviously possible for the valve body and the temperature sensor arrangement to be composed of more components. It is equally possible that, e.g., sealing members, e.g., fuel-resistant rubber seals, are present, e.g., at the valve slide in its surfaces that assume a sealing function. The positioning of the temperature sensor arrangement in association with the valve body is also only an example. It is obvious that another association of the positions, depending on the design of the heating burner, may also be provided, and it would also be possible to design the plunger 80 in the form of a bowden cable core. It would also be possible to transmit the pressure change of the medium present in the temperature sensor arrangement to the valve slide directly, i.e., without the intermediary of any mechanical components, and the valve slide would have a piston-like design in one end area in this case.

While specific embodiments of the invention have been shown and described in detail to illustrate the application of the principles of the invention, it will be understood that the invention may be embodied otherwise without departing from such principles.

What is claimed is:

1. A vehicle heating system fuel-operated heating burner temperature-controlled fuel valve, comprising:

a valve member that is adjustable as a function of a temperature in the area of a heating burner, said fuel valve further comprising a valve structure defining a feed area and two drain areas, the valve member interrupting a connection between the feed area and the two drain areas at a temperature in a first temperature range, the valve member not interrupting the connection between the feed area and the two drain areas at a temperature in a second temperature range that is higher than the first temperature range, and the valve member not interrupting the connection between the feed area and one of the drain areas and interrupts the connection between the feed area and the other of the drain areas at a temperature in a third temperature range that is higher than the second temperature range wherein the valve structure is a valve body with a first flow path area that can be brought into connection with the feed area and leads to the first drain area and to a second flow path area, and the second flow path area leads to a second drain area and the valve member has a first valve member surface and a second valve member surface directed opposite the first valve member surface and a first valve seat surface and a second valve seat surface are provided in the valve body for the first valve member surface and the second valve member surface, respectively, the first flow path area opening into the fast valve seat surface and the second flow path area opening into the second valve seat surface.

2. A fuel valve in accordance with claim 1, wherein when the first valve member is seated on the first valve seat surface, the second valve member surface is not seated on the second valve seat surface.

3. A heating system, comprising:

a heating burner with a combustion chamber;

a pump arrangement for delivering fuel to the combustion chamber; and a temperature-controlled fuel valve in the flow path between the pump arrangement and the combustion chamber, the fuel valve including a valve member that is adjustable as a function of a temperature in the area of a heating burner, said heating system further comprising a temperature sensor arrangement of the fuel valve provided for detecting a temperature in the area of a igniting member of the heating burner or in the area of a waste gas stream, wherein fuel can be introduced into the combustion chamber in the area of the igniting member via a first drain area of the fuel valve and fuel can be introduced into the combustion chamber in an area located farther away from the igniting member via a second drain area of the fuel valve.

4. A heating system in accordance with claim 3, wherein the second drain area offers a lower flow resistance than the first drain area.

5. A heating system in accordance with claim 3, further comprising a valve structure defining a feed area and two drain areas, the valve member interrupting a connection between the feed area and the two drain areas at a temperature in a first temperature range, the valve member not interrupting the connection between the feed area and the two drain areas at a temperature in a second temperature range that is higher than the first temperature range, and the valve member not interrupting the connection between the feed area and one of the drain areas and interrupts the connection between the feed area and the other of the drain areas at a temperature in a third temperature range that is higher than the second temperature range.

6. A heating system in accordance with claim 5, wherein the valve structure is a valve body with a first flow path area that can be brought into connection with the feed area and leads to the first drain area and to a second flow path area, wherein the second flow path area leads to a second drain area.

7. A heating system in accordance with claim 6, wherein the valve member closes the first flow path area at a temperature in the first temperature range, the valve member closes the second flow path area at a temperature in the third temperature range, and the valve member does not close the first and does not close the second flow path areas at a temperature in the second temperature range.

8. A heating system in accordance with claim 3, further comprising a temperature sensor arrangement with a temperature sensor medium with temperature-dependent volume and a transmission arrangement that can be displaced by a change in the volume of the temperature sensor medium and acts on the valve member.

9. A beating system in accordance with claim 8, wherein the transmission arrangement comprises a closing element that can be deformed by the change in the volume of the temperature sensor medium and a plunger that can be displaced by the deformation of the closing element.

10. A vehicle heating system fuel-operated heating burner temperature-controlled fuel valve, comprising:

a valve body;

a valve member that is adjustable in said valve body as a function of a temperature in the area of a heating burner, the valve body defining a feed area and two drain areas, the valve member interrupting a connection between the feed area and the two drain areas at a temperature in a first temperature range, the valve member not interrupting the connection between the feed area and the two drain areas at a temperature in a second temperature range that is higher than the first temperature range, and the valve member not interrupting the connection between the feed area end one of the drain areas and interrupts the connection between the feed area and the other of the drain areas at a temperature in a third temperature range that is higher than the second temperature range;

a temperature sensor arrangement with a temperature sensor medium with temperature-dependent volume; and a transmission arrangement that can be displaced by a change in the volume of the temperature sensor medium and acts on the valve member, wherein the valve body has a first flow path area that can be brought into connection with the feed area and leads to the first drain area and to a second flow path area, wherein the second flow path area leads to a second drain area and the valve member closes the first flow path area at a temperature in the first temperature range, the valve member closes the second flow path area at a temperature in the third temperature range, and the valve member cloes not dose the first and does not close the second flow path areas at a temperature in the second temperature range, the valve member having a first valve member surface and a second valve member surface directed opposite the first valve member surface and a first valve seat surface and a second valve seat surface are provided in the valve body for the first valve member surface and the second valve member surface, respectively, the first flow path area opening into the first valve seat surface and the second flow path area opening into the second valve seat surface.

* * * * *